(12) United States Patent
Hammer

(10) Patent No.: US 9,475,348 B2
(45) Date of Patent: Oct. 25, 2016

(54) METHOD OF MANAGING DATA BETWEEN AN RFID MARKER CARRIED BY A TIRE AND A SENSOR CARRIED BY A RIM

(75) Inventor: Marc Hammer, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 322 days.

(21) Appl. No.: 14/110,976

(22) PCT Filed: Apr. 12, 2012

(86) PCT No.: PCT/FR2012/050795
§ 371 (c)(1),
(2), (4) Date: Dec. 27, 2013

(87) PCT Pub. No.: WO2012/140367
PCT Pub. Date: Oct. 18, 2012

(65) Prior Publication Data
US 2014/0104052 A1 Apr. 17, 2014
US 2015/0273955 A2 Oct. 1, 2015

(30) Foreign Application Priority Data

Apr. 12, 2011 (FR) ...................................... 11 53191

(51) Int. Cl.
*B60C 23/00* (2006.01)
*B60C 23/04* (2006.01)
(Continued)

(52) U.S. Cl.
CPC ....... *B60C 23/0433* (2013.01); *B60C 23/0472* (2013.01); *B60C 23/0479* (2013.01);
(Continued)

(58) Field of Classification Search
CPC .............. B60C 23/04; B60C 23/0408; B60C 23/0476; B60C 23/0477

USPC ............... 340/442–447; 701/29.4, 31.1, 31.2
See application file for complete search history.

(56) References Cited

U.S. PATENT DOCUMENTS 5,826,210 A * 10/1998 Izumi .................... B60C 23/061
340/444
6,801,872 B2 * 10/2004 Normann ............ B60C 23/0416
324/160

(Continued)

FOREIGN PATENT DOCUMENTS

EP 1 769 948 A2 4/2007
JP 2002-225518 A 8/2002

(Continued)

OTHER PUBLICATIONS

Notification of Reason for Rejection issued by the JPO on Apr. 20, 2016, in connection with Japanese Application No. 2014-504377 (English translation of Notification is attached).

*Primary Examiner* — Daryl Pope
(74) *Attorney, Agent, or Firm* — Fitzpatrick, Cella, Harper & Scinto

(57) ABSTRACT

A method is provided to manage data transmitted between an RFID marker, which is mounted on a tire, and a wheel module, which is mounted on a rim. The wheel module includes a memory and at least one sensor. When the tire is mounted on the rim, a mounted assembly is formed, also known as a wheel, which is intended to be installed on a motor vehicle. According to the method, RFID data is transmitted between the RFID marker and the wheel module via an intermediate unit that is separate from the mounted assembly and the motor vehicle. The RFID data is stored in the memory of the wheel module. When the wheel module includes a sensor for detecting tire pressure, the RFID data stored in the memory of the wheel module is erased when a detected tire pressure is less than or equal to a predetermined pressure threshold.

18 Claims, 1 Drawing Sheet

(51) Int. Cl.
    *G06K 7/00*     (2006.01)
    *G06K 19/077*     (2006.01)
    *G07C 5/08*     (2006.01)

(52) U.S. Cl.
    CPC ......... *B60C23/0483* (2013.01); *G06K 7/0008* (2013.01); *G06K 19/077* (2013.01); *G06K 19/07764* (2013.01); *G07C 5/08* (2013.01)

(56) References Cited

U.S. PATENT DOCUMENTS

| | | | | |
|---|---|---|---|---|
| 7,104,123 B2* | 9/2006 | Stewart | ............... | B60C 23/0408 73/146.3 |
| 8,844,589 B2* | 9/2014 | Mariani | ............... | B60C 11/0083 152/209.11 |
| 2003/0084977 A1 | 5/2003 | Gonzaga | ............... | 152/381.5 |
| 2004/0044450 A1 | 3/2004 | Taguchi et al. | ............... | 701/29 |
| 2004/0164140 A1 | 8/2004 | Voeller et al. | ............... | 235/375 |
| 2005/0273218 A1* | 12/2005 | Breed | ............... | B60C 11/24 701/2 |
| 2014/0104052 A1* | 4/2014 | Hammer | ............... | G06K 7/0008 340/447 |

FOREIGN PATENT DOCUMENTS

| | | |
|---|---|---|
| JP | 2004-322828 A | 11/2004 |
| JP | 2004-322833 A | 11/2004 |
| JP | 2006-282091 A | 10/2006 |

\* cited by examiner

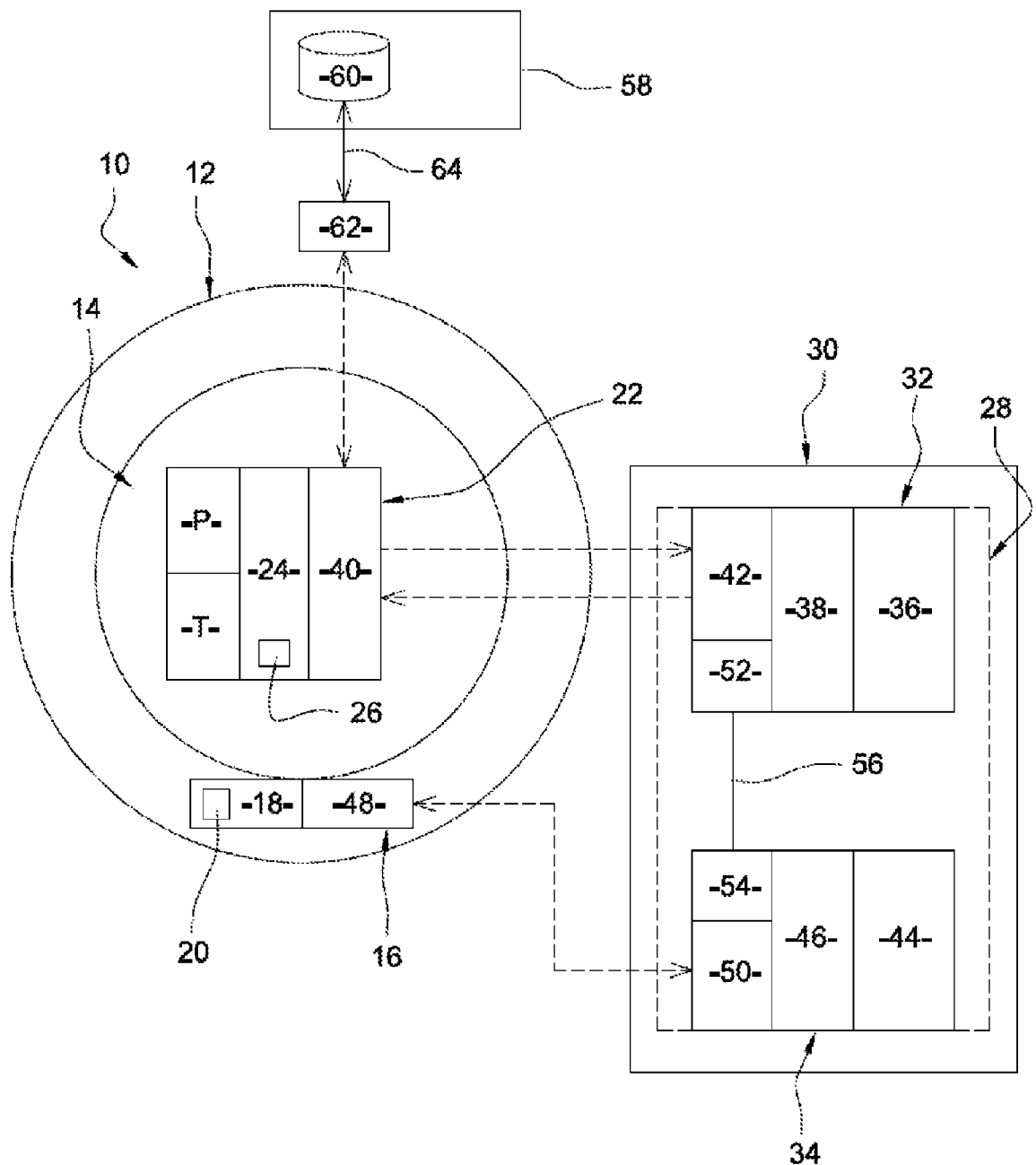

METHOD OF MANAGING DATA BETWEEN AN RFID MARKER CARRIED BY A TIRE AND A SENSOR CARRIED BY A RIM

FIELD OF THE INVENTION

The invention relates to the field of the management of data contained, on the one hand, in an RFID (Radio Frequency IDentification) marker connected to a tyre and, on the other hand, in a wheel module comprising at least one sensor, connected to a rim on which the tyre is mounted.

RELATED ART

The tyre mounted on the rim forms a mounted assembly generally called a wheel. The wheel is intended to be mounted on a motor vehicle.

There is a known way of monitoring the pressure of a mounted assembly with the aid of means based on what is known as TPMS (Tyre Pressure Monitoring System) technology. In this technology, the rim carries a wheel module comprising one or more sensors, generally including a tyre pressure sensor and a sensor of the temperature of the air contained in the tyre. The wheel module also comprises a microcontroller, provided with a data storage memory, which can, notably, process the data supplied by the sensors.

The wheel module is intended to communicate by radio frequency with a TPMS unit, which is generally separate from the mounted assembly and from the vehicle on which this assembly is mounted. The TPMS unit comprises a user interface and a microcontroller.

There is also a known way of fastening the wheel module to a surface of the tyre, for example by bonding a patch after the tyre has been cured. It is also possible to provide a pouch during the manufacture of the tyre, and to insert the wheel module into this pouch after curing.

The wheel module and the TPMS unit each comprise a wireless network module, such that they can communicate with one another by radio frequency. Generally, communication in the direction from the TPMS unit towards the wheel module takes place at low frequency, at 125 kHz for example, while communication in the direction from the wheel module towards the TPMS unit takes place at ultra-high frequency, for example at 315 MHz, 433 MHz or 868 MHz.

The TPMS unit, which is generally portable, can be used to parameterize the wheel module and, if necessary, to collect measurements originating from the sensors of this wheel module.

Normally, the wheel module can also communicate with a receiver on board the vehicle on which the wheel is mounted.

There is also a known way of storing identification data for the tyre in an RFID marker connected to the tyre. This marker generally includes a chip forming a microcontroller, provided with a memory for storing tyre identification data, and other data if necessary.

There is a known way of making the RFID marker and the wheel module communicate with one another, as disclosed, notably, in JP 2006282091. For this purpose, the wheel module is equipped with means for reading the data stored in the RFID marker.

The means for reading the RFID marker enable data relating, notably, to the identification of the tyre to be downloaded to the memory of the wheel module. Thus the module can transmit to the TPMS unit or a receiver on board the vehicle the data relating to the measurements of the sensors of this module, while associating them with identification data of the tyre.

However, it is relatively costly to equip each wheel module, and therefore each wheel of a motor vehicle, with means for reading an RFID marker. This is because some vehicles, notably heavy goods vehicles, comprise a very large number of wheels, and therefore a very large number of wheel modules. Consequently, in a vehicle of this type any supplementary equipment integrated into a wheel module, notably any RFID marker reading equipment, is multiplied by the number of wheels on the vehicle. The multiplication of the RFID marker reading equipment increases the costs associated with the set of wheels of the vehicle.

BRIEF DESCRIPTION OF EMBODIMENTS OF THE INVENTION

An object of the invention is, notably, to enable a wheel module to transmit data relating to measurements of sensors of this module in association with data relating to the identification of a tyre, the latter data being contained initially in an RFID marker, without the need to integrate RFID marker reading means into the module.

To this end, the invention proposes, notably, a method of managing data relating to an assembly comprising a tyre and a rim, the tyre carrying an RFID marker, and the assembly carrying a wheel module including at least one sensor, the assembly being capable of being in different states, notably a mounted state in which the tyre is mounted on the rim to form a mounted assembly, also called a wheel, intended to be fitted to a motor vehicle, in which method:

data are transmitted between the RFID marker and the wheel module via an intermediate unit, separate from the mounted assembly and the motor vehicle, comprising data transmission means; and these data, called RFID data, are stored in the wheel module;

characterized in that the wheel module comprises at least one pressure sensor of the tyre, and the RFID data stored in the wheel module are erased when the pressure detected by the pressure sensor is less than or equal to a predetermined pressure threshold.

As a result of the invention, a single intermediate unit, separate from any mounted assembly and from the motor vehicle carrying this mounted assembly, can be used to manage the data transmission, for the wheels of one or more vehicles, between the RFID marker and the wheel module fitted to a wheel.

A single intermediate unit can incorporate all the functionality normally found in a TPMS unit and an RFID marker reader. Thus the intermediate unit can transmit data between the RFID marker and the wheel module without the need to integrate RFID marker reading means into each wheel module.

Also as a result of the invention, the wheel module can transmit towards an appropriate receiver a set of data which associates data relating to the measurements of the module sensors with RFID data stored in the wheel module.

Generally, the mounted assembly is intended to undergo a maintenance operation, for example a tyre change, when the pressure in a mounted assembly falls below a predetermined threshold, reaching a zero level for example. By erasing the RFID data stored in the wheel module, it is possible to avoid retaining in this module the expired RFID data corresponding to a tyre which has been removed from the wheel.

Other, optional, features of this method of managing data are indicated below.

Data are transmitted between the RFID marker and the wheel module when the assembly comprising the tyre and the rim is in a predetermined state, for example a state in the course of mounting, a state after mounting, a mounted state with the tyre inflated, or a mounted state with the tyre deflated.

Some states of the assembly comprising the tyre and rim, for example the state in the course of mounting or the mounted state with the tyre deflated, imply that the assembly is located in a predetermined place for mounting or for maintenance of the assembly. It is useful to provide an intermediate unit for transmitting data between the RFID marker and the wheel module in this place, and therefore it is appropriate to transmit the RFID data when the assembly comprising the tyre and the rim is in a predetermined state corresponding to its presence in a predetermined place equipped with the intermediate unit.

Given that the wheel module comprises at least one pressure sensor of the tyre, the data of the RFID marker are to be transmitted towards the wheel module when:
the assembly comprising the tyre and the rim is in a predetermined mounted state, and
there are no RFID data stored in the wheel module.

The data transmission request may be made either by an operator or automatically, so as to enable the data supplied by the wheel module sensors to be associated as soon as possible with the RFID data.

Data are transmitted from the RFID marker towards the wheel module, and supplementary data supplied by the intermediate unit, for example data relating to a maintenance operation performed on the tyre, are added to these RFID data in the course of this data transmission.

Since it is likely that the data will be transmitted from the RFID marker towards the wheel module while the assembly comprising the tyre and the rim is in a predetermined place for a maintenance operation, it is appropriate to make use of this data transmission to transmit supplementary data relating to the maintenance operation, for example an indication of the execution of a tyre remoulding operation.

The invention also proposes a data transmission unit, characterized in that it forms an intermediate unit for data transmission using a method of managing data according to the invention.

According to other, optional, features of this data transmission unit,
the unit comprises:
means forming a wireless communication network between the intermediate unit and the RFID marker and between the intermediate unit and the wheel module,
means forming a microcontroller, and
means forming a user interface;
the unit comprises:
first and second units associated, respectively, with the wheel module and with the RFID marker,
means forming a communication network between the first and second units,
the means forming a wireless network including a first wireless network module arranged in the first unit, intended to communicate with the wheel module, and a second wireless network module arranged in the second unit, intended to communicate with the RFID marker,
the means forming a microcontroller comprising first and second microcontrollers arranged in the first and second units respectively,
the means forming a user interface comprising first and second interfaces arranged in the first and second units respectively;
the means forming a communication network between the first and second units are of the serial wired type;
the unit forms a portable assembly.

The invention also proposes a device for mounting a tyre on a rim, characterized in that it carries a data transmission unit according to the invention.

Since it is likely that data will be transmitted from the RFID marker towards the wheel module when the assembly comprising the tyre and the rim is in a state in the course of mounting, or in a state immediately after mounting, it may be appropriate to integrate the intermediate unit comprising the data transmission means into a device for mounting the tyre on the rim. In this case, the intermediate unit becomes a fixed unit.

BRIEF DESCRIPTION OF THE DRAWINGS

The invention relates more particularly to private motor vehicles, SUVs (Sport Utility Vehicles), two-wheeled vehicles (notably motorcycles), aircraft, and industrial vehicles chosen from among vans, heavy vehicles (i.e. light rail vehicles, buses, and road transport vehicles such as lorries, tractors and trailers), and off-road vehicles such as agricultural or civil engineering vehicles, and other transport or maintenance vehicles.

DETAILED DESCRIPTION OF EMBODIMENTS OF THE INVENTION

The invention will be more clearly understood from the following description, which is provided solely by way of example and which refers to the drawings, comprising a single FIGURE which is a schematic view of a set of means of managing data comprising the data transmission unit according to the invention, enabling the method of managing data according to the invention to be used.

An assembly 10 comprising a tyre 12 and a rim 14 is shown in the single FIGURE.

The assembly 10 can be in different states, notably a mounted state as shown in the FIGURE. In this state, the tyre 12 is mounted on the rim 14 to form a mounted assembly, also called a wheel. The mounted assembly is intended to be fitted to a motor vehicle.

The assembly 10 also comprises an RFID marker 16 connected in a known way to the tyre 12. This marker 16 includes a chip 18 forming a microcontroller provided with a memory 20. This memory 20 is intended to store data, called RFID data, comprising identification data for the tyre 12 and, if necessary, other data relevant to the tyre 12 concerned.

The rim 14 carries a wheel module 22 comprising one or more sensors; for example, as shown in the drawing, it comprises a pressure sensor P of the tyre and a sensor T of the temperature of the pressurized air in the tyre.

The wheel module 22 also comprises a microcontroller 24, provided with a data storage memory 26.

Also shown in the drawing is an intermediate unit 28, which is separate from the mounted assembly 10 and from the motor vehicle intended to carry this assembly 10, and which comprises data transmission means.

In the example shown in the drawing, the intermediate unit 28 is carried by a conventional device 30 for mounting the tyre 12 on the rim 14.

In a variant, the intermediate unit 28 could form a portable assembly.

The intermediate unit 28 comprises, in the illustrated example, first 32 and second 34 units associated, respectively, with the wheel module 22 and with the RFID marker 16.

The first unit 32 is a TPMS unit comprising a user interface 36 and a microcontroller 38. The TPMS unit 32 is intended to communicate with the wheel module 22 by radio frequency. For this purpose, the wheel module 22 comprises a wireless network module 40. Similarly, the TPMS unit comprises a wireless network module 42. Generally, the communication between the wheel module 22 and the TPMS unit 32 takes place at different frequencies, depending on the direction of the communication. Thus, generally, communication in the direction from the TPMS unit 32 towards the wheel module 22 takes place at low frequency, at 125 kHz for example, while communication in the direction from the wheel module 22 towards the TPMS unit takes place at ultra-high frequency, for example at 315 MHz, 433 MHz or 868 MHz.

The second unit 34 forms an RFID unit comprising a user interface 44 and a microcontroller 46. An RFID unit may comprise a PDA (Personal Digital Assistant).

The RFID marker 16 and the RFID unit 34 are intended to communicate with one another by radio frequency. For this purpose, the RFID marker 16 comprises a wireless network module 48. Similarly, the RFID unit 34 comprises a wireless network module 50.

Generally, the communication between the RFID marker 16 and the RFID unit 34 takes place at ultra-high frequency.

The wireless network modules 40, 42, 48, 50 thus form means for wireless communication, on the one hand, between the intermediate unit 28 and the RFID marker 16, and, on the other hand, between the intermediate unit 28 and the wheel module 22.

Additionally, the microcontrollers 38 and 46, in combination, constitute means forming a microcontroller of the intermediate unit 28, and the user interfaces 36 and 44, in combination, constitute means forming a user interface of the intermediate unit 28.

Thus, in a variant, the means forming a wireless communication network, the means forming a microcontroller and the means forming a user interface of the intermediate unit 28 could be combined in a single unit, rather than being distributed between the TPMS unit 32 and the RFID unit 34 as in the illustrated example.

The intermediate unit 28 further comprises means forming a communication network between the TPMS unit 32 and the RFID unit 34. In the illustrated example, these means comprise a wired network module 52 arranged in the TPMS unit 28 and a wired network module 54 arranged in the RFID unit 34. The network modules 52 and 54 are interconnected by a serial connection 56, for example a USB (Universal Serial Bus) or RS 232 connection. In a variant, the means forming a communication network between the TPMS unit 32 and the RFID unit 34 may be of the wireless type.

The drawing also shows a terminal 58 which may be on board the vehicle or separate from the vehicle. The terminal 58 is preferably equipped with a database 60.

The wheel module 22 is intended to communicate with the terminal 58, for example via an intermediate terminal 62 located on board the vehicle. This intermediate terminal 62 may, if necessary, receive data from a plurality of wheel modules carried by different wheels of the vehicle.

The intermediate terminal 62 is, for example, of the RCU (Receiver Control Unit) type. Thus, the network module 40 of the wheel module 22 is intended to communicate by radio frequency with the intermediate terminal 62. In the illustrated example, the intermediate terminal 62 is intended to communicate, by means of a serial wired network such as a CAN (Controller Area Network) bus 64, with the terminal 58, and more specifically with the database 60.

In a variant, the communication between the intermediate terminal 62 and the terminal 58, and more specifically the database 60, could take place through a wireless network of the GPRS (General Packet Radio Service) type.

The data exchange between the wheel module 22 and the terminal 58 may take place periodically or in response to one-off requests.

The intermediate unit 28 can be used to manage data relating to the assembly 10 comprising the tyre 12 carrying the RFID marker 16, and the rim 14 carrying the wheel module 22, according to the following method of management. The steps of this method which relate to the invention are defined below.

According to this method, data are transmitted between the RFID marker 16 and the wheel module 22 via the intermediate unit 28.

Preferably, this data transmission between the RFID marker 16 and the wheel module 22 takes place when the assembly 10 is in a predetermined state, for example a state in the course of mounting, a state after mounting (notably after a first mounting), a mounted state with the tyre inflated, or a mounted state with the tyre deflated.

Also preferably, provision is made to request the transmission of the data from the RFID marker 16 towards the wheel module 22 when:

the assembly 10 is in a predetermined mounted state, and there are no RFID data stored in the wheel module 22.

Thus, the preferred procedure is as follows.

First of all, an operator mounts the tyre 12 on the rim 14 and inflates the tyre. The assembly 10 is then in a mounted state with the tyre inflated.

Subsequently, in this state of the assembly 10, for example at the request of an operator via the terminal 58, or in response to an automatic request of the wheel module 22 which has detected that there are no RFID data stored in its memory 26, the RFID unit 34 reads the data stored in the memory 20 of the RFID marker 16 and then transmits them to the TPMS unit 32. This unit 32 then transmits the RFID data to the wheel module 22 so as to store these RFID data in the memory 26 of this module 22.

Thus the data from the RFID marker 16 transmitted towards the wheel module 22 are stored in the wheel module 22, or more specifically in the memory 26 of this module.

If necessary, when the TPMS unit 32 transmits the RFID data towards the wheel module 22, it adds to these RFID data supplementary data supplied by the TPMS unit 32 or the RFID unit 34, for example data relating to a maintenance operation which was performed on the tyre 12 before it was mounted on the rim 14.

After the RFID data have been stored in the memory 26 of the wheel module, the assembly 10 can be mounted on a vehicle equipped, for example, with the terminal 58 and with the intermediate terminal 62. The wheel assembly 22 can then transmit towards the intermediate terminal 62 and the terminal 58 a set of data which associate data relating to the sensors P and T with RFID data stored in the memory 26.

The database 60 can thus associate the measurements of the sensors with the RFID data which enable the tyre 12 to be identified.

If the pressure detected by the pressure sensor P is less than or equal to a predetermined pressure threshold, generally a threshold close to zero pressure, the RFID data stored in the wheel module 22 are erased, for example in an automatic manner. Thus, when a tyre 12 is changed, the replaced tyre is necessarily deflated, and therefore the RFID data relating to a tyre which has been removed from the assembly 10 are not stored in the memory 26 of the wheel module 22.

The invention claimed is:

1. A method of managing data relating to an assembly that includes a tire and a rim, wherein an RFID marker is mounted on the tire, wherein a wheel module is mounted on the rim, wherein the wheel module includes a memory and a pressure sensor, wherein the assembly has a plurality of states including a mounted state in which the tire is mounted on the rim to form a mounted assembly that is intended to be installed on a motor vehicle as a wheel, the method comprising steps of:
transmitting RFID data between a data transmitter of the RFID marker and a data transmitter of the wheel module via a data transmitter of an intermediate unit, wherein the intermediate unit is separate from the mounted assembly and the motor vehicle;
storing the RFID data in the memory of the wheel module; and
erasing the RFID data stored in the memory of the wheel module when a tire pressure detected by the pressure sensor is less than or equal to a predetermined pressure threshold.

2. The method according to claim 1, wherein the RFID data is transmitted between the data transmitter of the RFID marker and the data transmitter of the wheel module when the assembly is in a predetermined state that includes one of:
a state during mounting,
a state after mounting,
a mounted state with the tire being inflated, and
a mounted state with the tire being deflated.

3. The method according to claim 1, wherein transmission of the RFID data from the RFID marker to the wheel module is requested when:
the assembly is in a predetermined mounted state, and
no RFID data is stored in the memory of the wheel module.

4. The method according to claim 1, wherein, when the RFID data is transmitted from the RFID marker to the wheel module, supplementary data supplied by the intermediate unit is added to the RFID data during data transmission.

5. The method according to claim 2, wherein, when the RFID data is transmitted from the RFID marker to the wheel module, supplementary data supplied by the intermediate unit is added to the RFID data during data transmission.

6. The method according to claim 3, wherein, when the RFID data is transmitted from the RFID marker to the wheel module, supplementary data supplied by the intermediate unit is added to the RFID data during data transmission.

7. A data transmission system for a wheel useable on a motor vehicle, the system comprising:
a communication device that relays data between a wheel module mounted on a rim and an RFID marker mounted on a tire, the communication device being separate from each of the tire, the rim, and the motor vehicle,
wherein RFID data stored in a memory of the wheel module is erased when a tire pressure detected by a pressure sensor of the wheel module is less than or equal to a predetermined pressure threshold.

8. The data transmission system according to claim 7, wherein the communication device includes:
a microcontroller that controls relaying of the data, and
a user interface, and
wherein the communication device relays the data between the wheel module and the RFID marker via a wireless communication network.

9. The data transmission system according to claim 8, wherein the communication device includes:
a first communication module that includes a first wireless communicator for wirelessly receiving data from and wirelessly sending data to the wheel module,
a second communication module that includes a second wireless communicator for wirelessly receiving data from and wirelessly sending data to the RFID marker, and
a communication network connecting the first communication module and the second communication module, and
wherein the microcontroller includes:
a first controller that controls communications performed by the first communication module, and
a second controller that controls communications performed by the second communication module.

10. The data transmission system according to claim 9, wherein the communication network connecting the first communication module and the second communication module is a wired serial communication network.

11. The data transmission system according to claim 7, wherein the data transmission system is a portable assembly.

12. The data transmission system according to claim 8, wherein the data transmission system is a portable assembly.

13. The data transmission system according to claim 9, wherein the data transmission system is a portable assembly.

14. The data transmission system according to claim 10, wherein the data transmission system is a portable assembly.

15. The data transmission system according to claim 7, wherein the data transmission system is incorporated in an apparatus for mounting a tire on a rim.

16. The data transmission system according to claim 8, wherein the data transmission system is incorporated in an apparatus for mounting a tire on a rim.

17. The data transmission system according to claim 9, wherein the data transmission system is incorporated in an apparatus for mounting a tire on a rim.

18. The data transmission system according to claim 10, wherein the data transmission system is incorporated in an apparatus for mounting a tire on a rim.

* * * * *

UNITED STATES PATENT AND TRADEMARK OFFICE
CERTIFICATE OF CORRECTION

| | | |
|---|---|---|
| PATENT NO. | : 9,475,348 B2 | |
| APPLICATION NO. | : 14/110976 | |
| DATED | : October 25, 2016 | |
| INVENTOR(S) | : Marc Hammer | |

It is certified that error appears in the above-identified patent and that said Letters Patent is hereby corrected as shown below:

In the Specification

<u>Column 6</u>
Line 4, "type. Thus," should read --type. ¶Thus,--.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*